United States Patent
Lee et al.

(10) Patent No.: US 10,241,249 B2
(45) Date of Patent: Mar. 26, 2019

(54) POLARIZING PLATE AND OPTICAL DISPLAY INCLUDING THE SAME

(71) Applicant: SAMSUNG SDI CO., LTD., Yongin-si, Gyeonggi-do (KR)

(72) Inventors: Do Heon Lee, Suwon-si (KR); Tae Hyun Lee, Suwon-si (KR); In Cheon Han, Suwon-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 139 days.

(21) Appl. No.: 15/044,839

(22) Filed: Feb. 16, 2016

(65) Prior Publication Data
US 2016/0238771 A1   Aug. 18, 2016

(30) Foreign Application Priority Data
Feb. 16, 2015   (KR) ........................ 10-2015-0023700

(51) Int. Cl.
*G02B 5/30*   (2006.01)
*G02B 1/18*   (2015.01)
(Continued)

(52) U.S. Cl.
CPC ......... *G02B 5/3033* (2013.01); *C08G 59/223* (2013.01); *C08G 59/24* (2013.01);
(Continued)

(58) Field of Classification Search
CPC ...... G02B 5/30; G02B 5/3025; G02B 5/3033; G02B 5/3041; G02B 5/305; G02B 5/3083;
(Continued)

(56) References Cited

U.S. PATENT DOCUMENTS 6,177,524 B1 * 1/2001 Ohtsuka .............. C08F 287/00
525/332.9
2002/0197453 A1 * 12/2002 Usuki .................. B41M 7/0027
428/195.1
(Continued)

FOREIGN PATENT DOCUMENTS

CN   1564951 A   1/2005
CN   103748488 A   4/2014
(Continued)

OTHER PUBLICATIONS

Office Action dated Feb. 16, 2017 in the corresponding Korean Patent Application No. 10-2015-0023700.
(Continued)

*Primary Examiner* — Stephone B Allen
*Assistant Examiner* — Adam W Booher
(74) *Attorney, Agent, or Firm* — Lee & Morse, P.C.

(57) ABSTRACT

A polarizing plate includes a polarizer, a bonding layer on an upper surface of the polarizer, a protective film on an upper surface of the bonding layer and having a moisture transmittance of about 30 g/m2·24 hr or less at 40° C. and 90 % relative humidity (RH), and a barrier layer on a lower surface of the polarizer and formed of a barrier layer composition including an alicyclic epoxy resin having a glass transition temperature of about 200° C. or more. The polarizing plate may have a light transmittance variation rate of 3% or less, as calculated by Equation 1:

Light transmittance variation rate=|$T0-T500$|/$T0 \times 100$   (1), where $T0$ is an initial light transmittance and $T500$ is a light transmittance after 500 hours as set forth herein.

20 Claims, 2 Drawing Sheets

(51) Int. Cl.
*C08G 59/22* (2006.01)
*C08G 59/24* (2006.01)
*C08L 63/00* (2006.01)
*G02B 1/04* (2006.01)
*G02F 1/1335* (2006.01)

(52) U.S. Cl.
CPC ............... *C08L 63/00* (2013.01); *G02B 1/04* (2013.01); *G02B 1/18* (2015.01); *G02B 5/3083* (2013.01); *G02F 1/133528* (2013.01); *G02F 2202/28* (2013.01)

(58) Field of Classification Search
CPC . G02B 1/04; G02B 1/18; G02B 27/28; G02B 27/286; G02B 27/288; C08G 59/22; C08G 59/223; C08G 59/24; C08G 59/245; C08L 63/00–63/10; G02F 1/133528
See application file for complete search history.

(56) References Cited

U.S. PATENT DOCUMENTS

| | | | |
|---|---|---|---|
| 2008/0252973 A1 | 10/2008 | Akari et al. | |
| 2009/0036667 A1* | 2/2009 | Hashimoto | B29C 55/045 536/69 |
| 2010/0253884 A1 | 10/2010 | Katou et al. | |
| 2012/0328800 A1* | 12/2012 | Yoon | C09J 7/00 428/1.55 |
| 2013/0120693 A1* | 5/2013 | Shin | G02B 5/3025 349/96 |
| 2014/0071379 A1 | 3/2014 | Takahashi et al. | |
| 2015/0049380 A1* | 2/2015 | Takeda | G02B 5/30 359/352 |
| 2015/0331282 A1* | 11/2015 | Yamada | G02F 1/133603 349/69 |
| 2016/0177145 A1* | 6/2016 | Nam | C08L 1/14 524/40 |
| 2016/0229170 A1* | 8/2016 | Cho | G02B 1/14 |
| 2016/0238742 A1* | 8/2016 | Huh | G02B 1/14 |

FOREIGN PATENT DOCUMENTS

| | | |
|---|---|---|
| JP | 2009-205135 A | 9/2009 |
| JP | 2010-039399 A | 2/2010 |
| JP | 2014-224852 A | 12/2014 |
| KR | 10-2010-0018462 A | 2/2010 |
| KR | 10-2013-0020618 A | 2/2013 |
| TW | I386309 B | 2/2013 |
| TW | I406923 B | 9/2013 |

OTHER PUBLICATIONS

KST 1305—Testing method for permeability of damp proof packing materials.
TW Office Action dated Jan. 10, 2017 in the corresponding Taiwanese Patent Application No. 105104391.
Office Action dated Sep. 3, 2018, in the corresponding Chinese Patent Application No. 201610087210.8.

* cited by examiner

POLARIZING PLATE AND OPTICAL DISPLAY INCLUDING THE SAME

CROSS-REFERENCE TO RELATED APPLICATION

Korean Patent Application No. 10-2015-0023700, filed on Feb. 16, 2015, in the Korean Intellectual Property Office, and entitled: "Polarizing Plate and Optical Display Comprising the Same," is incorporated by reference herein in its entirety.

BACKGROUND

1. Field

Embodiments relate to a polarizing plate and an optical display including the same.

2. Description of the Related Art

A liquid crystal display (LCD) includes an LCD panel and polarizing plates disposed on both surfaces of the LCD panel. The polarizing plate may suffer from deterioration in durability due to infiltration of moisture into the polarizer under high temperature and high humidity conditions and the polarizer may suffer from deterioration in crack resistance.

SUMMARY

Embodiments are directed to a polarizing plate, including a polarizer, a bonding layer on an upper surface of the polarizer, a protective film on an upper surface of the bonding layer and having a moisture transmittance of about 30 g/m²·24 hr or less at 40° C. and 90% relative humidity (RH), and a barrier layer on a lower surface of the polarizer and formed of a barrier layer composition including an alicyclic epoxy resin having a glass transition temperature of about 200° C. or more. The polarizing plate may have a light transmittance variation rate of 3% or less, as calculated by Equation 1:

$$\text{Light transmittance variation rate} = |T0 - T500|/T0 \times 100 \quad (1),$$

where T0 is an initial light transmittance of the polarizing plate at a wavelength of 400 nm to 700 nm and T500 is a light transmittance of the polarizing plate at a wavelength of 400 nm to 700 nm after the polarizing plate is left at 85° C. and 85% RH for 500 hours and is then left at 25° C. for 1 hour.

The polarizing plate may have a moisture content variation rate of about 10% or less, as calculated by Equation 3:

$$\text{Moisture content variation rate} = |W500 - W0|/W0 \times 100 \quad (3),$$

where W0 is an initial moisture content of the polarizing plate and W500 is a moisture content of the polarizing plate after the polarizing plate is left at 85° C. and 85% RH for 500 hours.

The protective film may have an in-plane retardation (Re) of about 5,000 nm or more at a wavelength of 550 nm, as calculated by Equation 4:

$$Re = (nx - ny) \times d \quad (4),$$

where nx and ny are indices of refraction of the protective film at a wavelength of 550 nm in x-axis and y-axis directions of the protective film, respectively, and d is a thickness of the protective film in units of nm.

The protective film may include a film formed of a polyester resin.

The protective film may include a film formed by stretching a film including a polyester resin at an elongation of 5 times to 8 times an initial length thereof in a transverse direction (TD).

A machine direction (MD) of the polarizer may be orthogonal to a transverse direction (TD) of the protective film.

The polyester resin may include at least one selected from among polyethylene terephthalate, polyethylene naphthalate, polybutylene terephthalate, and polybutylene naphthalate.

A ratio of a total thickness of the protective film and the bonding layer to a thickness of the barrier layer may range from about 10:1 to about 50:1.

The barrier layer may have a thickness of about 2 μm to about 12 μm.

The alicyclic epoxy resin may be present in an amount of about 40 wt % to about 90 wt % in the barrier layer composition in terms of solid content.

The barrier layer composition may include an alicyclic epoxy resin; a monofunctional (meth)acrylic compound, a bifunctional (meth)acrylic compound, or a mixture thereof; and an initiator.

Each of the monofunctional (meth)acrylic compound and the bifunctional (meth)acrylic compound may include at least one hydroxyl group.

The barrier layer composition may include at least one of an epoxy monomer and a tri- or higher functional (meth)acrylic compound.

The epoxy monomer may include a monofunctional epoxy monomer.

The polarizing plate may further include an adhesive layer on a lower surface of the barrier layer.

The adhesive layer may have a modulus of about 0.1 MPa or less at 23° C.

The polarizing plate may have a thickness of about 115 μm or less.

Embodiments are also directed to an optical display including a polarizing plate according to an embodiment.

BRIEF DESCRIPTION OF THE DRAWINGS

Features will become apparent to those of skill in the art by describing in detail example embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey example implementations to those skilled in the art.

In the drawing figures, the dimensions of layers and regions may be exaggerated for clarity of illustration. Like reference numerals refer to like elements throughout.

As used herein, spatially relative terms such as "upper" and "lower" are defined with reference to the accompanying drawings. Thus, it will be understood that "upper" can be used interchangeably with "lower". In addition, it will be understood that when a layer is referred to as being "on" another layer, it can be directly formed on the other layer, or intervening layer(s) may also be present. Thus, it will be understood that when a layer is referred to as being "directly on" another layer, no intervening layer is interposed therebetween.

As used herein, the term "moisture transmittance" is measured with respect to a film, a barrier layer, or a stack structure of the polarizer and the barrier layer in accordance with KS T 1305.

As used herein, the term "modulus" refers to storage modulus, as measured using a rheometer through temperature sweep testing (strain 5%, normal force 100 N) at a temperature from 23° C. and a frequency of 1 Hz with respect to a 0.8 mm thick specimen prepared by applying an adhesive composition to a release film (for example, a polyethylene terephthalate film) curing the applied adhesive composition at 35° C./45% RH to form adhesive films, and stacking the adhesive films to a thickness of 0.8 mm.

As used herein, the term "(meth)acryl" refers to acryl and/or methacryl.

As used herein, the term "substituted" in "substituted or unsubstituted" means that at least one hydrogen atom in a corresponding functional group is substituted with a $C_1$ to $C_{10}$alkyl group, a hydroxyl group, an amino group, a $C_6$ to $C_{10}$ aryl group, a halogen, a cyano group, a $C_3$ to $C_{10}$ cycloalkyl group, or a $C_7$ to $C_{10}$ arylalkyl group.

Figure 1:
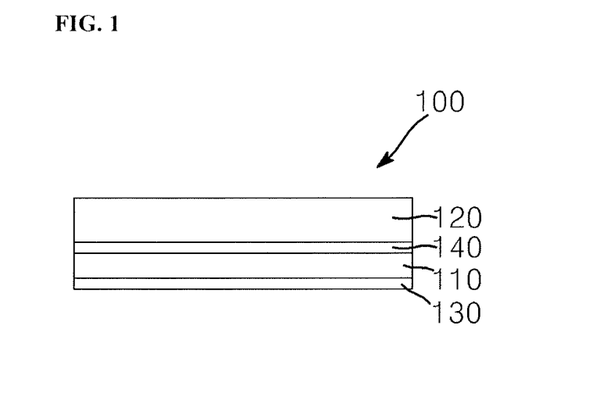
FIG. 1 illustrates a sectional view of a polarizing plate according to an example embodiment.

Hereinafter, a polarizing plate according to an example embodiment will be described with reference to FIG. 1. FIG. 1 is a sectional view of a polarizing plate according to an example embodiment.

Referring to FIG. 1, a polarizing plate 100 according to one embodiment includes a polarizer 110, a protective film 120, a barrier, and a bonding layer 140.

The polarizing plate 100 may have a light transmittance variation rate of about 3% or less, for example, about 0% to about 3.0%, as calculated by the following Equation 1. Within this range, the polarizing plate provides good durability under high temperature/high humidity conditions and thus can be used in an optical display.

Light transmittance variation rate=$|T0-T500|/T0\times100$ <Equation 1>

In Equation 1, T0 is the initial light transmittance of the polarizing plate at a wavelength of 400 nm to 700 nm and T500 is the light transmittance of the polarizing plate at a wavelength of 400 nm to 700 nm after the polarizing plate is left at 85° C. and 85% RH for 500 hours and is then left at 25° C. for 1 hour.

For the polarizing plate 100, T500 may be less than or equal to T0 (T500≤T0) in Equation 1 and each of T500 and T0 may be about 30% or more, for example, about 30% to about 50%, for example, about 40% to about 49%, at a wavelength of 400 nm to 700 nm.

The polarizing plate 100 may have a polarization variation rate of about 5% or less, for example, about 0% to about 3%, as calculated by the following Equation 2. Within this range, the polarizing plate provides good durability under high temperature/high humidity conditions and thus can be used in an optical display.

Polarization variation rate=$|P0-P500|/P0\times100$ <Equation 2>

In Equation 2, P0 is the initial degree of polarization of the polarizing plate and P500 is the degree of polarization of the polarizing plate after the polarizing plate is left at 85° C. and 85% RH for 500 hours and is then left at 25° C. for 1 hour.

For the polarizing plate 100, P500 may be less than or equal to P0 (P500≤P0) in Equation 2, and each of P500 and P0 may be about 90% or more, for example, about 95.000% to about 99.990%.

The polarizing plate 100 may have a moisture content variation rate of about 10% or less, for example, about 0.8% to about 5%, as calculated by the following Equation 3. Within this range, the polarizing plate provides good durability under high temperature/high humidity conditions and thus can be used in an optical display.

Moisture content variation rate=$|W500-W0|/W0\times100$ <Equation 3>

In Equation 3, W0 is the initial moisture content of the polarizing plate and W500 is the moisture content of the polarizing plate after the polarizing plate is left at 85° C. and 85% RH for 500 hours.

As used herein, the "moisture content" is calculated by an equation $|A-B|$, wherein A is the weight of the polarizing plate before drying and B is the weight of the polarizing plate after the polarizing plate is dried in an oven at 105° C. for 2 hours. Here, the moisture content is measured on a specimen of the polarizing plate cut to a size of 10 cm×10 cm (length×width).

The polarizing plate 100 may have a thickness of about 115 μm or less, for example, about 108 μm or less, for example, about 56 μm or less. For example, the polarizing plate 100 may have a thickness of about 50 μm to about 115 μm. The polarizing plate 100 may have a light transmittance of about 30% or more at a wavelength of 400 nm to 700 nm, for example, about 30% to about 50%, for example, about 40% to about 49%. The polarizing plate 100 may have a degree of polarization of about 90% or more, for example, about 95.000% to about 99.990%.

Next, the polarizer 110, the protective film 120, the barrier layer 130, and the bonding layer 140 according to this embodiment, and methods for manufacturing the same will be described in more detail.

The polarizer 110 is disposed between the barrier layer 130 and the bonding layer 140 and can polarize light entering the polarizing plate 100.

The polarizer 110 may include a polarizer fabricated using a polyvinyl alcohol resin film. In one embodiment, the polarizer may be a polyvinyl alcohol-based polarizer fabricated by adsorbing at least one of iodine and a dichroic dye into a polyvinyl alcohol resin film. In another embodiment, the polarizer may be a polyene-based polarizer fabricated through dehydration of the polyvinyl alcohol resin film. The light transmittance may be measured value of an average transmittance at 400 nm to 700 nm.

The polyvinyl alcohol resin film may have a degree of saponification of about 85 mol % to about 100 mol %, for example, about 98 mol % to about 100 mol %. The polyvinyl alcohol resin film may have a degree of polarization of about 1,000 to about 10,000, for example, about 1,500 to about 10,000. The polyvinyl alcohol resin film may have thickness of about 50 μm to about 200 μm. The polarizer may be fabricated within these ranges of the degree of saponification, the degree of polarization and thickness.

For example, the polyvinyl alcohol-based polarizer may be fabricated by adsorbing at least one of iodine and a dichroic dye into a polyvinyl alcohol resin film, followed by uniaxially stretching the polyvinyl alcohol resin film to a final elongation of 2 times to 8 times an initial length thereof, for example, 3 times to 6 times in the machine direction (MD). Stretching may include dry stretching, wet stretching, and a combination thereof. As used herein, the term "final elongation" means a ratio of length of a final polyvinyl alcohol-based polarizer to initial length of a polyvinyl alcohol resin film. The polyvinyl alcohol-based polarizer may be further subjected to color correction by dipping the stretched polyvinyl alcohol resin film in a boric acid solution or a potassium iodide solution.

For example, the polyene-based polarizer may be fabricated through dehydration of a polyvinyl alcohol resin film with an acid catalyst, followed by drying. The acid catalyst may include an organic acid including an aromatic sulfonic acid such as toluene sulfonic acid including p-toluene sulfonic acid, an inorganic acid, or a mixture thereof.

The polarizer 110 may have a thickness of about 5 μm to about 100 μm, for example, about 5 μm to about 50 μm. Within this range, the polarizer may have a light transmittance variation rate as calculated by Equation 1, a polarization variation rate as calculated by Equation 2, and a moisture content variation rate as calculated by Equation 3, when combined with the protective film and the bonding layer.

To provide the polarizing plate with a desirable thin structure, the polarizer 110 may have a thickness of about 5 μm about 6 μm, about 7 μm, about 8 μm, about 9 μm, about 10 μm, about 11 μm, or about 12 μm.

The protective film 120 is disposed on one surface of the polarizer 110 and helps to protect the polarizer 110. The protective film 120 may be disposed on one surface of the polarizer 110 via the bonding layer 140.

The protective film 120 may have a moisture transmittance of about 30 g/m²·24 hr or less, for example, about 1 g/m²·24 hr to about 25 g/m²·24 hr, for example, about 5 g/m²·24 hr to about 15 g/m²·24 hr. Within this range, the protective film 120 may block infiltration of external moisture into the polarizer, which may improve durability of the polarizing plate under high temperature/high humidity conditions, and which may further improve durability of the polarizing plate under high temperature/high humidity conditions together with the bonding layer.

The protective film 120 may have an in-plane retardation (Re) of about 5,000 nm or more at a wavelength of 550 nm, for example, about 5,000 nm to about 15,000 nm, for example, about 6,000 nm to about 12,000 nm, as calculated by the following Equation 4. Within this range, the polarizing plate may not exhibit rainbow spots in use.

$$Re = (nx - ny) \times d \qquad \text{<Equation 4>}$$

In Equation 4, nx and ny are the indices of refraction of the protective film at a wavelength of 550 nm in the x-axis and y-axis directions of the protective film, respectively, and d is the thickness of the protective film (unit: nm).

The protective film 120 may have a degree of biaxiality (NZ) of about 1.8 or less at a wavelength of 550 nm, for example, about 1.0 to about 1.8, as calculated by the following Equation 5. Within this range, the protective film may effectively remove rainbow spots based on birefringence.

$$NZ = (nx - nz)/(nx - ny) \qquad \text{<Equation 5>}$$

In Equation 5, nx, ny, and nz are the indices of refraction of the protective film at a wavelength of 550 nm in the x-axis, y-axis, and z-axis directions of the protective film, respectively.

The protective film 120 may have an out-of-plane retardation (Rth) of about 15,000 nm or less at a wavelength of 550 nm, for example, about 6,000 nm to about 12,000 nm, as calculated by the following Equation 6. Within this range, the protective film may prevent generation of rainbow spots by birefringence.

$$Rth = ((nx + ny)/2 - nz) \times d \qquad \text{<Equation 6>}$$

In Equation 6, nx, ny and nz are the indices of refraction of the protective film at a wavelength of 550 nm in the x-axis, y-axis and z-axis directions of the protective film, respectively, and d is the thickness of the protective film (unit: nm).

For the protective film 120, one of nx, that is, the index of refraction in the x-axis direction, and ny, that is, the index of refraction in the y-axis direction at a wavelength of 550 nm, may be about 1.65 or more. If both nx and ny are less than about 1.65 or both nx and ny are about 1.65 or more, rainbow spots from birefringence due to variation in retardation depending upon angles of incidence and wavelengths may appear in use of the protective film. In one embodiment, nx may be about 1.65 or more, for example, about 1.67 to about 1.75, and ny may be about 1.45 to about 1.55. In another embodiment, ny may be about 1.65 or more, for example, about 1.67 to about 1.72, for example, about 1.69 to about 1.72, and nx may be about 1.45 to about 1.55. The value of |nx−ny| may be about 0.1 to about 0.2, for example, about 0.12 to about 0.18. Within this range, it may be possible to improve viewing angle while preventing generation of rainbow spots.

As used herein, the x-axis direction means a slow axis direction of the protective film, the y-axis direction means a fast axis of the protective film, and the z-axis direction means a thickness direction of the protective film, wherein the x-axis, the y-axis, and the z-axis are orthogonal to one another.

The protective film 120 may include an optically transparent film formed of a polyester resin. For example, the polyester resin may include at least one of polyethylene terephthalate, polyethylene naphthalate, polybutylene terephthalate, polybutylene naphthalate, etc. In one embodiment, the protective film 120 may be formed of one kind of polyester resin and may be a monolayer film. Although the protective film 120 may be a monolayer film, the protective layer may have moisture transmittance within the above range, which may help improve durability of the polarizing plate under high temperature/high humidity conditions.

In the present example embodiment, the protective film 120 is a TD (transverse direction) uniaxially stretched film as described above and the polarizer 110 is an MD uniaxially stretched film. In the polarizing plate 100, the TD of the protective film 120 may be substantially orthogonal to the MD of the polarizer 110. As a result, it may be possible to prevent the polarizing plate 100 from suffering from warpage. As used herein, "substantially orthogonal to" may include not only the case where the TD of the protective film and the MD of the polarizer cross each other, but also the case where the TD of the protective film and the MD of the polarizer cross each other at a certain angle within an acceptable margin of error from 90°.

Although not shown in FIG. 1, the protective film 120 may further include a functional coating layer on one surface of the protective film 120 to provide additional functions to the polarizing plate. For example, the functional coating layer may include one or more of a hard coating layer, an anti-reflection layer, an anti-fingerprint layer, an antistatic layer, a low reflective layer, etc. The functional coating layer may have a thickness of about 1 μm to about 100 μm, for example, about 1 μm to about 50 μm, for example, about 1 μm to about 20 μm. Within this range, the functional coating layer may provide additional functions to the polarizing plate without affecting the protective film.

Although not shown in FIG. 1, the protective film 120 may further include a primer layer on the other surface of the protective film 120 to enhance bonding between the polarizer 110 and the protective film 120 via the bonding layer 140. The primer layer may become a hydrophilic surface modification layer. The primer layer may be formed by coating a composition including a resin for the primer layer having both a hydrophilic group and a hydrophobic group. For example, the resin for the primer layer may include at least one of a polyester resin and a polyvinyl acetate resin. The primer layer may have a thickness of about 1 nm to about 100 nm, for example, about 1 nm to about 50 nm, for example, about 1 nm to about 20 nm. Within this range, the primer layer may secure good adhesion to the polarizer and high total luminous transmittance.

The protective film 120 may have a thickness of about 5 μm to about 200 for example, about 10 μm to about 150 μm, for example, about 50 μm to about 120 μm. Within this range, the protective film may suppress warpage of the polarizing plate together with the barrier layer.

The protective film 120 may be fabricated by melt extruding a protective film composition including a polyester resin to form a melt-extruded resin film, stretching the melt-extruded resin film to 2 times to 10 times an initial length thereof only in the TD, heat treating the stretched resin film, and stretching the resulting film under tension relaxation conditions in the TD stretching.

The protective film composition including a polyester resin may further include additives in addition to the polyester resin. For example, the additives may include a UV absorbent, a leveling agent, an antistatic agent, etc. The UV absorbent may include a UV absorbent capable of absorbing light having a wavelength of about 200 nm to about 400 nm. For example, the UV absorbent may include at least one selected from among phenol, benzotriazole, salicylic acid, triazine, and oxamide UV absorbents. The phenol UV absorbent has high compatibility with the polyester resin and thus good mixability with the polyester resin, and may thus avoid elution from the polyester film and suppress generation of holes in the inside or surface of the film, thereby providing good appearance.

According to the present example embodiment, the melt-extruded resin film is stretched to about 2 times to about 10 times an initial length thereof, for example, about 5 times to about 8 times, only in the TD. Within this range, the protective film may prevent generation of rainbow spots. The melt-extruded resin film may be stretched to about 1 time to about 1.1 times the initial length thereof in the MD. Herein, "about 1 time to about 1.1 times in the MD" means that there is no additional stretching excluding mechanical stretching by movement of the melt-extruded resin film on a roller and the like in the MD during TD stretching of the melt-extruded resin film. Stretching may include at least one of dry stretching and wet stretching. Stretching may be performed at a temperature from (Tg−20)° C. to (Tg+20)° C., in which Tg is a glass transition temperature of the polyester resin, for example, from about 70° C. to about 150° C., for example, from about 80° C. to about 130° C., for example, from about 90° C. to about 120° C. Within these ranges of elongation and stretching temperature, the extruded resin film may be uniformly stretched.

Before stretching the melt-extruded resin film in the TD, at least one of the functional coating layer and the primer layer may be further formed on at least one surface of the melt-extruded resin film.

According to the present example embodiment, heat treatment and TD stretching under tension-relaxation conditions are performed to crystallize and stabilize the film through heat treatment while stretching the resin film only in the TD. Heat treatment is performed at the glass transition temperature Tg of polyester resin or more, for example, about 100° C. to about 300° C. for about 1 second to about 2 hours. TD elongation may be about 0 times to about 3 times, for example, about 0.1 times to about 2 times, for example, about 0.1 times to about 1 times. Within these ranges of temperature and elongation, the protective film may maintain retardation and may achieve crystallization and stabilization.

The barrier layer 130 may be formed on the other surface of the polarizer 110 and protect the polarizer 110 at a side opposite to the protective film 120 while blocking external moisture from infiltrating the polarizer 110, thereby improving durability of the polarizing plate 100 under high temperature/high humidity conditions.

The barrier layer 130 may improve durability of the polarizing plate under high temperature and high humidity conditions by significantly reducing influence of external moisture on the polarizer 110. The polarizer 110 may have a moisture transmittance of about 1300 g/m²·24 hr to about 1400 g/m²·24 hr. A total moisture transmittance of the barrier layer 130 and the polarizer 110 may be about 500 g/m²·24 hr or less, for example, about 300 g/m²·24 hr or less, for example, about 10 g/m²·24 hr to about 300 g/m²·24 hr. Within this range, it may be possible to improve durability of the polarizing plate under high temperature/high humidity conditions.

The barrier layer 130 may be formed directly under the polarizer 110 to exhibit high adhesion to the polarizer 110. Thus, the barrier layer 130 may be directly formed under the polarizer 110 without the bonding layer 140, thereby realizing a thin structure of the polarizing plate 100.

The barrier layer 130 may be formed on the other surface of the polarizer 110 with respect to both the protective film 120 and the bonding layer 140 to suppress warpage of the polarizing plate 100. A ratio of total thickness of the protective film and the bonding layer to thickness of the barrier layer may range from about 5:1 to about 100:1, for example, from about 10:1 to about 50:1, for example, from about 10:1 to about 30:1. Within this range of thickness, the polarizing plate may be prevented from warping.

The barrier layer 130 may have a thickness of about 20 μm or less, for example, about 2 μm to about 15 μm, for example, about 5 μm to about 12 μm. Within this range, the barrier layer may have a suitable thickness with respect to the total thickness of the protective film and the bonding layer to suppress warpage of the polarizing plate while improving barrier performance to prevent cracking.

The barrier layer 130 may be formed of a barrier layer composition. The barrier layer composition may be a photocurable composition and may be cured by active energy rays including UV light, electron beams, and the like. Next, the barrier layer composition will be described in more detail.

The barrier layer composition may include a curable component and an initiator. As used herein, the term "curable component" means a component of the barrier layer composition that may be cured by active energy rays.

The barrier layer composition may include an alicyclic epoxy resin having a glass transition temperature (Tg) of about 200° C. or more and a mono- or bifunctional (meth) acrylic compound as the curable component, and the initiator.

The alicyclic epoxy resin may have a glass transition temperature of about 200° C. or more, for example, about 200° C. to about 300° C., for example, about 200° C. to about 260° C. The alicyclic epoxy resin may be cured by active energy rays, may improve adhesion with respect to the polarizer, and may exhibit good polymerization performance. Within this range of the glass transition temperature, the alicyclic epoxy resin may improve durability of the polarizing plate under high temperature/high humidity conditions together with the protective film while improving crack resistance of the polarizer by blocking infiltration of external moisture into the polarizer. Furthermore, within this glass transition temperature range, the alicyclic epoxy resin may reinforce the barrier layer to exhibit a certain range of strength with respect to both the bonding layer and the protective film such that the barrier layer may suppress warpage of the polarizing plate while improving crack resistance of the polarizer by suppressing warpage of the polarizer in the elongation direction, that is, in the MD. For the polarizing plate in which the protective film and the bonding layer are formed only on one surface of the polarizer, moisture infiltration may occur on the other surface of the polarizer, thereby causing deterioration in durability of the polarizing plate under high temperature/high humidity conditions and making it difficult to suppress shrinkage and warpage of the polarizing plate. The polarizing plate in which the protective film and the bonding layer are formed on both surfaces of the polarizer may not provide a thin structure.

In one embodiment, the alicyclic epoxy resin may include a resin having one or more alicyclic epoxy groups, for example, two or more alicyclic epoxy groups. As used herein, the "alicyclic epoxy group" means a $C_2$ to $C_{20}$ epoxidized alicyclic functional group, a $C_2$ to $C_{20}$ alicyclic group having a $C_2$ to $C_{20}$ epoxidized alicyclic functional group, or a $C_1$ to $C_{10}$ alkyl group having a $C_2$ to $C_{20}$ epoxidized alicyclic functional group. For example, the alicyclic epoxy group may be at least one of epoxy cyclohexyl group; an oxiranyl group; an oxiranyl group-containing cyclohexyl group; and a glycidyl group.

As the alicyclic epoxy resin, CELLOXIDE 8000 and EHPE 3150 (all available from Daicel Corporation) may be used. These alicyclic epoxy resins may be used alone or in combination thereof when used in the photocurable composition.

In the barrier layer composition, the alicyclic epoxy resin may be present in an amount of about 40 wt % to about 90 wt %, for example, about 50 wt % to about 85 wt %, in terms of solid content. Within this range, the barrier layer composition may exhibit good adhesion to the polarizer, have a high glass transition temperature to improve crack resistance of the polarizer, and may prevent increase in viscosity to provide good coatability.

In the curable component of the barrier layer composition, the alicyclic epoxy resin may be present in an amount of about 40 wt % to about 90 wt %, for example, about 60 wt % to about 90 wt %, for example, about 40 wt % to about 80 wt %, or for example, about 50 wt % to about 85 wt %. Within this range, the curable component of the barrier layer composition may exhibit good adhesion to the polarizer, secure a high glass transition temperature of the barrier layer composition to provide good crack resistance, and may prevent increase in viscosity to provide good coatability.

In the barrier layer composition, the mono- or bifunctional (meth)acrylic compound may improve coatability of the composition by decreasing viscosity of the barrier layer composition, increase hardness of the barrier layer, and promote curing of the barrier layer composition. The mono- or bifunctional (meth)acrylic compound may be reacted by a radical photoinitiator.

The mono- or bifunctional (meth)acrylic compound may include a monofunctional (meth)acrylic compound having one (meth)acryloxy group per molecule, a bifunctional (meth)acrylic compound having two (meth)acryloxy groups per molecule, an oligomer thereof, or a mixture thereof. These mono- or bifunctional (meth)acrylic compounds may be used alone or in combination thereof in the barrier layer composition.

The monofunctional (meth)acrylic compound may include an unsubstituted $C_1$ to $C_{10}$ alkyl group-containing (meth)acrylate, a $C_1$ to $C_{10}$ alkyl group-containing (meth)acrylate having at least one hydroxyl group, a $C_3$ to $C_{10}$ alicyclic group-containing (meth)acrylate, a $C_6$ to $C_{20}$ aryl group-containing (meth)acrylate, or a $C_7$ to $C_{20}$ arylalkyl group-containing (meth)acrylate. For example, the monofunctional (meth)acrylic compound may include at least one selected from among t-butyl (meth)acrylate, isobutyl (meth)acrylate, 2-ethylhexyl (meth)acrylate, 2-hydroxyethyl (meth)acrylate, 2- or 3-hydroxypropyl (meth)acrylate, 2-hydroxybutyl (meth)acrylate, 2-hydroxy-3-phenoxypropyl (meth)acrylate, cyclohexyl (meth)acrylate, isobornyl (meth)acrylate, and benzyl (meth)acrylate.

In some embodiments, the monofunctional (meth)acrylic compound may include at least one selected from among tetrahydrofurfuryl (meth)acrylate, phenoxyethyl (meth)acrylate, dicyclopentenyloxyethyl (meth)acrylate, dimethylaminoethyl (meth)acrylate, ethylcarbitol (meth)acrylate, trimethylolpropane mono(meth)acrylate, pentaerythritol mono(meth)acrylate, and phenoxypolyethylene glycol mono (meth)acrylate.

In some embodiments, the monofunctional (meth)acrylic compound may include a (meth)acrylic monomer having a carboxylic acid group. For example, the (meth)acrylic monomer having a carboxylic acid group may include at least one selected from among (meth)acrylic acid, 2-(meth)acryloyloxyethyl phthalic acid, 2-(meth)acryloyloxyethyl hexahydrophthalic acid, carboxyethyl (meth)acrylate, 2-(meth)acryloyloxyethyl succinic acid, N-(meth)acryloyloxy-N',N'-dicarboxymethyl-p-phenylenediamine, and 4-(meth)acryloyloxyethyl trimellitic acid.

The bifunctional (meth)acrylic compound may include at least one selected from among unsubstituted alkylene glycol di(meth)acrylate, polyoxyalkylene glycol di(meth)acrylate, halogenated alkylene glycol di(meth)acrylate, di(meth)acrylates of aliphatic polyols, di(meth)acrylates of hydrogenated dicyclopentadiene or tricyclodecane dialkanol, di(meth)acrylates of dioxane glycol or dioxane dialkanol, di(meth)acrylates of bisphenol A or bisphenol F with alkylene oxide adducts, and epoxy di(meth)acrylates of bisphenol A or bisphenol F.

For example, the bifunctional (meth)acrylic compound may include at least one selected from among ethylene glycol di(meth)acrylate, 1,3-butanediol di(meth)acrylate, 1,4-butanediol di(meth)acrylate, 1,6-hexanediol di(meth)acrylate, 1,9-nonanediol di(meth)acrylate, neopentyl glycol di(meth)acrylate, trimethylolpropane di(meth)acrylate, pentaerythritol di(meth)acrylate, ditrimethylolpropane di(meth)acrylate, diethylene glycol di(meth)acrylate, triethylene glycol di(meth)acrylate, dipropylene glycol di(meth)acrylate, tripropylene glycol di(meth)acrylate, polyethylene glycol di(meth)acrylate, polypropylene glycol di(meth)acrylate, polytetramethylene glycol di(meth)acrylate, silicon di(meth)acrylate, hydroxy pivalic acid ester neopentyl glycol di(meth)acrylate, 2,2-bis[4-(meth)acryloyloxyethoxyethoxyphenyl]propane, 2,2-bis[4-(meth) acryloyloxyethoxyethoxycyclohexyl]propane, hydrogenated dicyclopentadienyl di(meth)acrylate, tricyclodecanedimethanol di(meth)acrylate, 1,3-dioxane-2,5-diyl di(meth)acrylate, and tris(hydroxyethyl)isocyanurate di(meth)acrylate.

The mono- or bifunctional (meth)acrylic compound having at least one hydroxyl group may improve adhesion between the polarizer and the barrier layer through reaction between the polarizer and the hydroxyl group. Further, the mono- or bifunctional (meth)acrylic compound having at least one hydroxyl group may not suffer from obstruction with respect to curing reaction by moisture and thus may be stably cured without obstruction by moisture in the polarizer, thereby improving reliability of the barrier layer. The mono- or bifunctional (meth)acrylic compound having at least one hydroxyl group may have a glass transition temperature of about −45° C. to about 60° C. The mono- or bifunctional (meth)acrylic compound having one or more hydroxyl groups, for example, 1 to 10 hydroxyl groups, may include at least one of a $C_1$ to $C_{10}$ alkyl group-containing (meth)acrylate having at least one hydroxyl group, and trimethylolpropane di(meth)acrylate.

In the curable component of the barrier layer composition, the mono- or bifunctional (meth)acrylic compound may be present in an amount of about 10 wt % to about 60 wt %, for example, about 10 wt % to about 50 wt %, for example, about 10 wt % to about 40 wt % in terms of solid content. Within this range, the mono- or bifunctional (meth)acrylic compound may improve adhesion between the polarizer and the barrier layer while improving crack resistance of the polarizer.

The initiator may cure the curable component. The initiator may include at least one of a cationic photoinitiator and a radical photoinitiator. These initiators may be used alone or in combination thereof.

The cationic photoinitiator may include, for example, onium salts including a cation and an anion. For example, the cation may include: diaryliodonium such as diphenyliodonium, 4-methoxydiphenyliodonium, bis(4-methylphenyl)iodonium, bis(4-tert-butylphenyl)iodonium, bis(dodecylphenyl)iodonium, and (4-methylphenyl)[(4-(2-methylpropyl)phenyl)iodonium; triarylsulfonium such as triphenylsulfonium, diphenyl-4-thiophenoxyphenylsulfonium; bis[4-(diphenylsulfonio)phenyl]sulfide, and the like. The anion may include hexafluorophosphate ($PF_6^-$), tetrafluoroborate ($BF_4^-$), hexafluoroantimonate ($SbF_6^-$), hexafluoroarsenate ($AsF_6^-$), hexachloroantimonate ($SbCl_6^-$), and the like.

The radical photoinitiator may include, for example, one or more of thioxanthone, phosphorus, triazine, acetophenone, benzophenone, benzoin, or oxime radical photoinitiators.

The initiator may be present in an amount of about 0.1 parts by weight to about 10 parts by weight, for example, about 1 part by weight to about 6 parts by weight, based on 100 parts by weight of the curable component of the barrier layer composition. Within this range, the initiator may secure sufficient curing of the curable component and may prevent deterioration in transparency of the barrier layer due to a residual initiator.

In one embodiment, the barrier layer composition may include a curable component, which includes about 40 wt % to about 90 wt % of the alicyclic epoxy resin, about 10 wt % to about 60 wt % of the mono- or bifunctional (meth) acrylic compound, and about 0.1 parts by weight to about 10 parts by weight of the initiator based on 100 parts by weight of the curable component, in terms of solid content.

The barrier layer composition may further include at least one of an epoxy monomer and a tri- or higher functional (meth)acrylic compound as the curable component.

In the barrier layer composition, the epoxy monomer may improve coatability of the barrier layer composition by reducing viscosity thereof and may be cured together with the alicyclic epoxy resin to improve the moisture blocking effects of the barrier layer. Furthermore, like the alicyclic epoxy resin, the epoxy monomer includes an epoxy group, thereby improving compatibility of the barrier layer composition.

The epoxy monomer may include a tri- or higher functional epoxy monomer having three or more epoxy groups, and/or the epoxy monomer may include a mono- or bifunctional epoxy monomer. The epoxy monomer may react with the alicyclic epoxy resin, thereby allowing easy control of curing reaction rate and improving reactivity of an epoxy resin and cohesion of the barrier layer composition, while preventing excessive increase in crosslinking density of the barrier layer. The epoxy monomer may include a monofunctional epoxy monomer to increase cohesion thereof when reacted with the alicyclic epoxy resin having a glass transition temperature Tg of 200° C. or more while preventing excessive increase in crosslinking density of the barrier layer.

The monofunctional epoxy monomer may include at least one of an aliphatic epoxy monomer, an aromatic epoxy monomer, an alicyclic epoxy monomer, and a hydrogenated aromatic epoxy monomer. The monofunctional epoxy monomer may be glycidyl ether. For example, the monofunctional epoxy monomer may be represented by Formula 1.

<Formula 1>

In Formula 1, R is a substituted or unsubstituted $C_1$ to $C_{20}$ alkyl group, a substituted or unsubstituted $C_6$ to $C_{20}$ aryl group, a substituted or unsubstituted $C_7$ to $C_{20}$ arylalkyl group, or a substituted or unsubstituted $C_3$ to $C_{20}$ cycloalkyl group.

For example, the monofunctional epoxy monomer may include at least one selected from among ethylglycidylether, butylglycidylether, hexylglycidylether, octylglycidylether, 2-ethylhexylglycidylether, dodecylglycidylether, octadecylglycidylether, phenylglycidylether, and cresylglycidylether.

In the barrier layer composition, the epoxy monomer may be present in a lower amount as compared with the alicyclic epoxy resin. For example, a weight ratio of the epoxy monomer to the alicyclic epoxy resin may range from about 1:3 to about 1:15 in the barrier layer composition.

When included in the curable component of the barrier layer composition, the epoxy monomer may be present in an amount of more than 0 wt % to about 30 wt %, for example, about 5 wt % to about 30 wt %, for example, about 5 wt % to about 20 wt %, in terms of solid content. Within this range, the epoxy monomer may improve cohesion of the barrier layer composition, promote curing of the barrier layer composition, and improve crack resistance of the polarizer.

In one embodiment, the barrier layer composition may include a curable component, which includes about 40 wt % to about 80 wt % of the alicyclic epoxy resin, about 10 wt % to about 50 wt % of the mono- or bifunctional (meth) acrylic compound, and about 5 wt % to about 30 wt % of the epoxy monomer, and about 0.1 parts by weight to about 10 parts by weight of the initiator based on 100 parts by weight of the curable component, in terms of solid content.

The tri- or higher functional (meth)acrylic compound may increase cohesion energy of the barrier layer and reliability thereof by improving crosslinking density of the barrier layer. The tri- or higher functional (meth)acrylic compound may be reacted with the radical photoinitiator. Specifically, the tri- or higher functional (meth)acrylic compound may be a tri-functional to hexa-functional (meth)acrylic compound.

The tri- or higher functional (meth)acrylic compound may include poly(meth)acrylates of unsubstituted tri- or higher aliphatic polyols such as unsubstituted glycerin tri(meth) acrylate, trimethylolpropane tri(meth)acrylate, ditrimethylolpropane tri(meth)acrylate, ditrimethylolpropane tetra(meth)acrylate, pentaerythritol tri(meth)acrylate, pentaerythritol tetra(meth)acrylate, dipentaerythritol tetra(meth)acrylate, dipentaerythritol penta(meth)acrylate, dipentaerythritol hexa(meth)acrylate, and the like. Further, the tri- or higher functional (meth)acrylic compound may include at least one selected from among poly(meth)acrylates of halogenated aliphatic polyols, tri(meth)acrylates of glycerin with alkylene oxide adducts, tri(meth)acrylates of trimethylolpropane with alkylene oxide adducts, 1,1,1-tris [(meth)acryloyloxyethoxyethoxy]propane, and tris(hydroxyethylisocyanurate) tri(meth)acrylate.

When included in the curable component of the barrier layer composition, the tri- or higher functional (meth)acrylic compound may be present in an amount of more than 0 wt % to about 10 wt %, for example, about 0.1 wt % to about 10 wt %, for example, about 1 wt % to about 5 wt %, in terms of solid content. Within this range, the tri- or higher functional (meth)acrylic compound may improve reliability of the barrier layer, prevent shrinkage of the barrier layer composition upon curing to prevent deterioration in adhesion of the barrier layer, and may secure good cuttability of the polarizing plate.

Like the mono- or bifunctional (meth)acrylic compound, the tri- or higher functional (meth)acrylic compound is a radical polymerizable compound and thus may be include in a suitable content in order to improve effects of the barrier layer and the polarizing plate. The tri- or higher functional (meth)acrylic compound may be present in an amount of about 20 wt % or less, for example, about 10 wt % to about 20 wt %, in the total amount of the mono- or bifunctional (meth)acrylic compound and the tri- or higher functional (meth)acrylic compound. Within this range, the tri- or higher functional (meth)acrylic compound may undergo less shrinkage upon curing to prevent deterioration in adhesion of the barrier layer and may prevent cutting failure.

In one embodiment, the barrier layer composition may include a curable component, which includes 40 wt % to about 80 wt % of the alicyclic epoxy resin, about 10 wt % to about 50 wt % of the mono- or bifunctional (meth)acrylic compound, about 5 wt % to about 30 wt % of the epoxy monomer, and about 0.1 wt % to about 10 wt % of the tri- or higher functional (meth)acrylic compound, and about 0.1 parts by weight to about 10 parts by weight of the initiator based on 100 parts by weight of the curable component, in terms of solid content.

The barrier layer composition may be a solvent-free type composition or may further include a solvent in order to improve coatability, paintability, or processability. The solvent may include methylethylketone, methylisobutylketone, and propylene glycol monomethyl ether acetate, without being limited thereto.

The barrier layer composition may further include additives. The additives may provide additional functions to the barrier layer. For example, the additives may include a UV absorbent, a reaction inhibitor, an adhesion promoter, a thixotropic agent, a conductivity imparting agent, a color regulator, a stabilizer, an antistatic agent, an antioxidant, a leveling agent, etc.

The barrier layer composition may further include nanoparticles to further improve hardness and mechanical strength of the barrier layer. For example, the nanoparticles may include fine hygroscopic particles to further improve the moisture blocking effects of the barrier layer.

The nanoparticles may include one or more of silica, aluminum oxide, zirconium oxide, titanium oxide, etc. The nanoparticles may be partially or entirely surface-treated with an epoxy group, a (meth)acrylate group or a vinyl group. The nanoparticles may have a suitable shape and size. The nanoparticles may include particles having circular, flake, amorphous shapes, and the like. The nanoparticles may have an average particle diameter of about 1 nm to about 200 nm, for example, about 8 nm to about 50 nm. Within this range, the nanoparticles may improve hardness of the barrier layer without adverse effects on surface roughness and transparency of the barrier layer. The nanoparticles may present in an amount of about 3 wt % to about 30 wt % of the barrier layer composition, for example, about 5 wt % to about 20 wt %. Within this range, the nanoparticles may improve hardness of the barrier layer without adverse effects on surface roughness and transparency of the barrier layer. The barrier layer composition may have a viscosity at 25° C. of about 5 cP to about 200 cP, for example, about 10 cP to about 150 cP. Within this range, the barrier layer composition may easily form a barrier layer.

According to the present example embodiment, the bonding layer 140 is formed between the polarizer 110 and the protective film 120 to bond the polarizer 110 to the protective film 120.

The bonding layer 140 may have a thickness of, for example, about 5 μm or less, for example, about 1 μm to about 4 μm.

According to the present example embodiment, the bonding layer 140 is formed of an active energy ray-curable adhesive composition and may improve durability of the polarizing plate under high temperature/high humidity conditions together with the protective film, and crack resistance.

The adhesive composition may include an epoxy compound, a (meth)acrylic compound, and an initiator.

The epoxy compound may include an alicyclic epoxy compound, an aromatic epoxy compound, an aliphatic epoxy compound, a hydrogenated epoxy compound, or a mixture thereof.

The alicyclic epoxy compound may be a compound in which an alicyclic group has at least one epoxy group. The alicyclic epoxy compound may be alicyclic diepoxy carboxylate. Examples of the alicyclic epoxy compound may include 3,4-epoxycyclohexylmethyl-3',4'-epoxycyclohexanecarboxylate, 2-(3,4-epoxycyclohexyl-5,5-spiro-3,4-epoxy) cyclohexane-meta-dioxane, bis(3,4-epoxycyclohexylmethyl)adipate, bis(3,4-epoxy-6-methylcyclohexyl)adipate, 3,4-epoxy-6-methylcyclohexyl-3',4'-epoxy-6'-methylcyclohexanecarboxylate, ε-caprolactone-modified 3,4-epoxycyclohexylmethyl-3',4'-epoxycyclohexanecarboxylate, trimethylcaprolactone-modified 3,4-epoxycyclohexylmethyl-3', 4'-epoxycyclohexanecarboxylate, β-methyl-δ-valerolactone-modified 3,4-epoxycyclohexylmethyl-3',4'-epoxycyclohexanecarboxylate, methylenebis(3,4-epoxycyclohexane), di(3,4-epoxycyclohexylmethyl)ether of ethylene glycol, ethylene bis(3,4-epoxycyclohexanecarboxylate), epoxycyclohexahydrophthalic acid dioctyl, epoxycyclohexahydrophthalic acid di-2-ethylhexyl, and the like.

The aromatic epoxy compound may include bisphenol A, bisphenol F, phenol novolac, cresol novolac, bisphenol A-novolac, dichloropentadiene novolac, glycidyl ether of triphenolmethane, triglycidyl p-aminophenol, tetraglycidyl methylene dianiline, and the like.

Examples of the aliphatic epoxy compound may include 1,4-butanediol diglycidyl ether, 1,6-hexanediol diglycidyl ether. neopentyl glycol diglycidyl ether, trimethylolpropane triglycidyl ether, polyethylene glycol diglycidyl ether, glycerin triglycidyl ether, polypropylene glycol diglycidyl ethers; polyglycidyl ethers of polyether polyols obtained by adding one or more kinds of alkylene oxide to aliphatic polyhydric alcohols such as ethylene glycol, propylene glycol, glycerin, and the like; diglycidyl esters of aliphatic long-chain dibasic acids; monoglycidyl ethers of aliphatic higher alcohols; glycidyl ethers of higher fatty acids; epoxidized soybean oil; butyl epoxystearate; octyl epoxystearate; epoxidized linseed oil; epoxidized polybutadiene, and the like.

The hydrogenated epoxy compound refers to a resin obtained through selective hydrogenation of an aromatic epoxy in the presence of a catalyst under pressure. Examples of the aromatic epoxy may include bisphenol type epoxy resins such as diglycidyl ether of bisphenol A, diglycidyl ether of bisphenol F, diglycidyl ether of bisphenol S, and the like; novolac type epoxy resins, such as a phenol novolac epoxy resin, a cresol novolac epoxy resin, a hydroxybenzaldehyde phenol novolac epoxy resin, and the like; polyfunctional epoxy resins, such as a glycidyl ether of tetrahydroxy phenylmethane, a glycidyl ether of tetrahydroxybenzophenone, epoxidized polyvinylphenol, and the like. Although the hydrogenated epoxy resin may be obtained by adding hydrogen to a mother nucleus of the aromatic epoxy resin, glycidyl ether of hydrogenated bisphenol A may be used in an embodiment.

The (meth)acrylic compound may include at least one of a monofunctional (meth)acrylate having one (meth)acrylate group and a bifunctional (meth)acrylate having two (meth)acrylate groups. The (meth)acrylic compound may contain at least one hydroxyl group to improve adhesion to the polarizer. For example, the (meth)acrylic compound may include at least one selected from among 2-hydroxyethyl (meth)acrylate, 4-hydroxybutyl (meth)acrylate, 2-hydroxypropyl (meth)acrylate, 2-hydroxybutyl (meth)acrylate, 6-hydroxyhexyl (meth)acrylate, 1,4-cyclohexanedimethanol mono(meth)acrylate, 1-chloro-2-hydroxypropyl (meth)acrylate, diethylene glycol mono(meth)acrylate, 1,6-hexanediol mono(meth)acrylate, 2-hydroxy-3-phenyloxypropyl (meth) acrylate, 4-hydroxycyclopentyl (meth)acrylate, 2-hydroxy-3-phenyloxybutyl (meth)acrylate, and 4-hydroxycyclohexyl (meth)acrylate.

Based on a total amount of 100 parts by weight of the epoxy compound and the (meth)acrylic compound, the epoxy compound may be present in an amount of about 50 parts by weight to about 90 parts by weight and the (meth) acrylic compound may be present in an amount of about 10 parts by weight to about 50 parts by weight. Within this range, the epoxy compound and the (meth)acrylic compound provide good adhesion to the polarizer.

The initiator may cure the epoxy compound and the (meth)acrylic compound. The initiator may include at least one of a cationic photoinitiator and a radical photoinitiator. These initiators may be used alone or in combination thereof. Examples the cationic photoinitiator and the radical photoinitiator are as described above in connection with the barrier layer.

The initiator may be present in an amount of, for example, about 0.1 parts by weight to about 10 parts by weight, for example, about 1 part by weight to about 6 parts by weight, based on a total amount of 100 parts by weight of the epoxy compound and the (meth)acrylic compound in terms of solid content. Within this range, the initiator may secure sufficient curing of the epoxy compound and the (meth)acrylic compound and may prevent deterioration in transparency of the bonding layer due to a residual initiator.

Hereinafter, a method of fabricating a polarizing plate according to an example embodiment will be described.

The polarizing plate according to one embodiment may be fabricated by depositing a composition for polarizing plates onto one surface of a protective film, placing the protective film on one surface of a polarizer. depositing a barrier layer composition onto the other surface of the polarizer, followed by curing the bonding layer composition and the barrier layer composition.

Each of the bonding layer composition and the barrier layer composition may be deposited by a typical coating method. For example, the bonding layer composition and the barrier layer composition may be deposited by die coating, gravure coating, and the like. Curing may be performed by irradiation with active energy rays, for example, irradiation with UV light at an irradiance of about 100 mW/cm$^2$ to about 2000 mW/cm$^2$ and a fluence of about 100 mJ/cm$^2$ to about 1000 mJ/cm$^2$.

Figure 2:
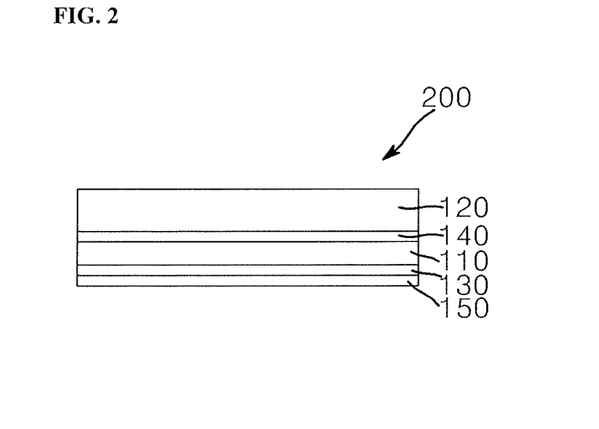
FIG. 2 illustrates a sectional view of a polarizing plate according to another embodiment of the present invention.

Next, a polarizing plate according to another embodiment will be described with reference to FIG. 2. FIG. 2 is a sectional view of a polarizing plate according to another embodiment.

Referring to FIG. 2, a polarizing plate 200 according to the present example embodiment includes a polarizer 110, a protective film 120, a barrier layer 130, a bonding layer 140, and an adhesive layer 150. The polarizing plate includes the adhesive layer 150 formed on a lower surface of the barrier layer 130 such that an optical display panel such as a liquid crystal panel may be attached to the polarizing plate. The polarizing plate according to this embodiment is substantially the same as the polarizing plate according to the above embodiment. The following description will focus only on the adhesive layer.

The adhesive layer 150 is formed on the lower surface of the barrier layer 130 to attach an optical display panel such as a liquid crystal panel to the polarizing plate.

The adhesive layer 150 may have a modulus of, for example, about 0.1 MPa or less, for example, about 0.001 MPa to about 0.1 MPa. Within this range, the adhesive layer may minimize warpage of the protective film, the bonding layer, the polarizer, and the barrier layer upon stacking, and may relieve stress of the polarizer, thereby providing good crack resistance. The polarizing plate 200 may have a warpage of about 3 mm or less, for example, about 0 mm to about 2.5 mm.

The adhesive layer 150 may have a thickness of, for example, about 5 μm to 40 μm, for example, about 10 μm to 30 μm.

The adhesive layer 150 may be formed of an adhesive layer composition, which may include a (meth)acrylic copolymer and a crosslinking agent. The following description is given of the adhesive layer composition.

The adhesive layer composition may include a (meth) acrylic copolymer a monomer mixture including an alkyl group-containing (meth)acrylic monomer and a hydroxyl group-containing (meth)acrylic monomer, and a crosslinking agent.

The alkyl group-containing (meth)acrylic monomer may include an unsubstituted $C_1$ to $C_{20}$ alkyl group-containing (meth)acrylic acid ester. Specifically, the alkyl group-containing (meth)acrylic monomer may include at least one selected from among ethyl (meth)acrylate, propyl (meth) acrylate, N-butyl (meth)acrylate, pentyl (meth)acrylate, and 2-ethylhexyl (meth)acrylate. These may be used alone or in combination thereof.

The hydroxyl group-containing (meth)acrylic monomer may include a (meth)acrylic ester containing a $C_1$ to $C_{20}$ alkyl group having at least one hydroxyl group. Specifically, the hydroxyl group-containing (meth)acrylic monomer may include at least one selected from among 2-hydroxyethyl (meth)acrylate, 3-hydroxypropyl (meth)acrylate, and 4-hydroxybutyl (meth)acrylate. These may be used alone or in combination thereof.

The monomer mixture may be present in an amount of about 90 parts by weight to about 99 parts by weight of the alkyl group-containing (meth)acrylic monomer and about 1 part by weight to about 10 parts by weight of hydroxyl group-containing (meth)acrylic monomer in terms of solid content. Within this range of monomer mixture, the composition may exhibit high adhesion with respect to the barrier layer and liquid crystal glass.

The (meth)acrylic copolymer may be prepared by a suitable method. For example, the (meth)acrylic copolymer may be prepared by adding the initiator to the monomer mixture, followed by reacting at about 50° C. to about 100° C. The initiator may be, for example, 2,2'-azobisisobutyronitrile (AIBN). The initiator may be present in an amount of about 0.01 parts by weight to about 1 part by weight based on 100 parts by weight of the monomer mixture. Within this range, the (meth)acrylic copolymer may be prepared at high yield.

The crosslinking agent serves to cure the (meth)acrylic copolymer and may include a suitable isocyanate crosslinking agent. For example, the crosslinking agent may include at least one selected from among hexamethylene diisocyanate, toluene diisocyanate, xylene diisocyanate, isophorone diisocyanate, naphthalene diisocyanate, and an adduct of trimethylolpropane-modified toluene diisocyanate. The crosslinking agent may be present in an amount of about 0.1 parts by weight to about 1 part by weight based on 100 parts by weight of the (meth)acrylic copolymer. Within this range, the adhesive composition may be suitably crosslinked, thereby exhibiting adhesive effects.

The adhesive composition may further include at least one of a silane coupling agent and a crosslinking catalyst.

The silane coupling agent may increase adhesive strength of the adhesive layer formed of the adhesive composition. The silane coupling agent may be an epoxy group-containing silane coupling agent such as glycidoxypropyltrimethoxysilane, glycidoxypropylmethyldimethoxysilane, and the like. The silane coupling agent may be present in an amount of about 0.1 parts by weight to about 5 parts by weight based on 100 parts by weight of the (meth)acrylic copolymer. Within this range, the silane coupling agent may increase adhesive strength. The crosslinking catalyst may improve the degree of crosslinking of the adhesive layer formed of the adhesive composition. The crosslinking catalyst may include at least one of a metal or a metal-containing compound. For example, the crosslinking catalyst may include at least one of tin-containing compounds, zinc-containing compounds, titanium compounds, and bismuth compounds. For example, the crosslinking catalyst may include at least one of dibutyltin dilaurate and tin dimaleate. The crosslinking catalyst may be present in an amount of, for example, about 0.01 parts by weight to about 1.5 parts by weight based on 100 parts by weight of the (meth)acrylic copolymer. Within this range, the crosslinking catalyst may increase the degree of crosslinking of the adhesive composition and may suppress moisture infiltration.

An optical display according to an example embodiment may include the polarizing plate according to embodiments. The optical display may be, for example, a liquid crystal display.

Figure 3:
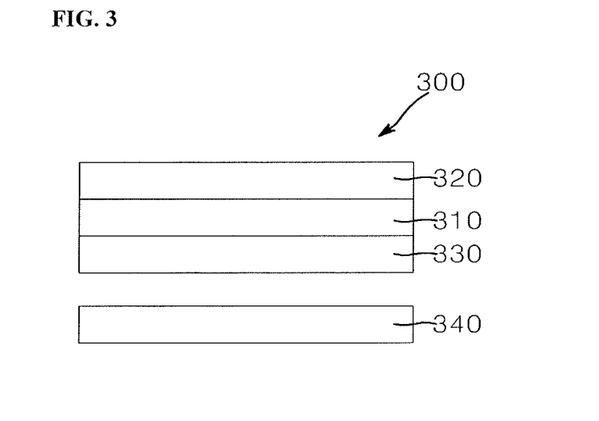
FIG. 3 illustrates a sectional view of a liquid crystal display according to an example embodiment.

Next, an optical display according to an example embodiment will be described with reference to FIG. 3. FIG. 3 is a sectional view of an optical display according to an example embodiment.

Referring to FIG. 3, a liquid crystal display 300 according to one embodiment includes a liquid crystal panel 310, a first polarizing plate 320 disposed on one surface of the liquid crystal panel 310, a second polarizing plate 330 disposed on the other surface of the liquid crystal panel 310. and a backlight unit 340 disposed on a lower surface of the second polarizing plate 330, wherein the first polarizing plate 320 may include the polarizing plate according to embodiments described herein.

The liquid crystal panel 310 is interposed between the first polarizing plate 320 and the second polarizing plate 330 and allows light having passed through the second polarizing plate to transmit to the first polarizing plate 320 therethrough. The liquid crystal panel 310 includes a liquid crystal layer, which may adopt, for example, an in-plane switching (IPS) mode, a twisted nematic (TN) mode, a vertical alignment (VA) mode, a patterned vertical alignment (PVA) mode, or a super-patterned vertical alignment (S-PVA) mode.

The second polarizing plate 330 may include a polarizer and a protective film formed on at least one surface of the polarizer. The polarizer serves to polarize light received from the backlight unit 340 and may include a suitable polarizer. The protective film is an optically transparent film and may be formed of at least one resin selected from among polyester resins such as a polyethylene terephthalate resin and a polyethylene naphthalate resin, cellulose resins such as a cycloolefin polymer (COP) resin and a triacetylcellulose resin, polyacetal resins, acrylic resins, polycarbonate resins, styrene resins, vinyl resins, polyphenylene ether resins, non-cyclic polyolefin resins such as polyethylene and polypropylene, acrylonitrile-butadiene-styrene copolymer resins, polyacrylate resins, polyaryl sulfone resins, polyether sulfone resins, polyphenylene sulfide resins, fluorine resins, and (meth)acrylic resins.

The backlight unit 340 may include a light guide plate, a light source, a reflective sheet, a diffusive sheet, and the like.

In the liquid crystal display 300 shown in FIG. 3, the first polarizing plate 320 is the polarizing plate according to embodiments. In another implementation, the second polarizing plate 330 may be the polarizing plate according to embodiments and the first polarizing plate 320 may be a suitable polarizing plate. In another implementation, both the first polarizing plate 320 and the second polarizing plate 330 may be the polarizing plates according to embodiments.

EXAMPLES

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Details of components used in Examples and Comparative Examples are as follows.

A: Alicyclic epoxy resin (cycloaliphatic diepoxide, CELLOXIDE 8000, Tg: 255° C., Daicel Corporation)

B: Alicyclic epoxy resin (cycloaliphatic epoxide, EHPE 3150, Tg: 224° C., Daicel Corporation)

C: Alicyclic epoxy resin (cycloaliphatic diepoxide, CELLOXIDE 2021P, Tg: 196° C., Daicel Corporation)

D: 2-hydroxyethyl acrylate (Sigma-Aldrich Corporation)

E: Phenyl glycidyl ether (EX-141, Nagase Co., Ltd.)

F: 2-ethylhexylglycidylether (EX-121, Nagese Co., Ltd.)

G: Pentaerythritol tetraacrylate (M-340, Miwon Commercial Co., Ltd.)

H: Protective film 1 (polyethylene terephthalate film, moisture transmittance: 10 g/m$^2$·24 hr, Re: 10,500 nm, Rth: 12,000 nm at 550 nm, thickness: 80 μm, Toyobo Co., Ltd.)

I: Protective film 2 (triacetylcellulose film, moisture transmittance: 400 g/m$^2$·24 hr, Ro: 2 nm at 550 nm, thickness: 80 Fuji Co., Ltd.)

J: 2,4,6-trimethylbenzoyldiphenylphosphineoxide (Darocur TPO, Ciba Co., Ltd.))

K: (4-methylphenyl)[4-(2-methylpropyl)phenyl]iodonium hexafluorophosphate (Irgacure 250, Ciba Co., Ltd.))

*Moisture transmittance of each of the protective films was measured in accordance with KS T 1305.

Example 1

Fabrication of Polarizer

A polyvinyl alcohol film (saponification degree: 99.5 mol %, polarization degree: 2000, thickness: 80 μm, Kuraray Co., Ltd) was dipped and dyed in a 0.3% iodine solution. The dyed film was mono-axially stretched to a length of 5.0 times an initial length thereof. The stretched polyvinyl alcohol film was dipped in a 3% boric acid solution and a 2% potassium iodide solution to perform color correction. Then, the polyvinyl alcohol film was dried at 50° C. for 4 minutes, thereby providing a 23 μm thick polarizer.

Preparation of Bonding Layer Composition 60 parts by weight of CELLOXIDE 2021P and 40 parts by weight of 2-hydroxyethyl methacrylate were mixed, followed by additionally adding 1 part by weight of Darocur TPO and 2 parts by weight of Irgacure 250 to the mixture, thereby preparing a bonding layer composition.

Preparation of Barrier Layer Composition 70 parts by weight of CELLOXIDE 8000 and 30 parts by weight of 2-hydroxyethyl acrylate were mixed to prepare a curable component. 2 parts by weight of Darocur TPO and 3 parts by weight of Irgacure 250 were further added to the curable component, thereby preparing a barrier layer composition.

Fabrication of Polarizing Plate

A polarizing plate was fabricated under conditions of 22° C. to 25° C. and 20% RH to 60% RH. The prepared bonding layer composition was deposited onto one surface of the protective film 1 to form a bonding layer, which in turn was bonded to one surface of the polarizer. The barrier layer composition was deposited onto the other surface of the polarizer and irradiated with UV light at 400 mW/cm$^2$ and 1000 mJ/cm$^2$ using a metal halide lamp, thereby fabricating a polarizing plate in which a barrier layer (thickness: 5 μm), the polarizer (thickness: 23 μm), the bonding layer (thickness: 3 μm), and the protective film 1 (thickness: 80 μm) are sequentially stacked.

Examples 2 to 8

Each of polarizing plates was fabricated in the same manner as in Example 1 except that the barrier layer composition was prepared using a curable component as listed in Table 1 (unit: parts by weight) instead of the curable component prepared by mixing 70 parts by weight of CELLOXIDE 8000 and 30 parts by weight of 2-hydroxyethyl acrylate.

Example 9

In a 1 L reactor provided with a cooler for temperature regulation under a nitrogen condition, 1 part by weight of 4-hydroxybutyl acrylate and 99 parts by weight of N-butyl acrylate were placed, followed by adding 120 parts by weight of ethyl acetate thereto. After removing oxygen by purging with nitrogen gas for 60 minutes, the reactor was maintained at 60° C., and 0.03 parts by weight of 2,2'-azobisisobutyronitrile (AIBN) diluted to a concentration of 45% with ethyl acetate was added as a reaction initiator to the reactor. Then, reaction was performed at 60° C. for 8 hours, thereby preparing an acrylic copolymer. The prepared acrylic copolymer had a weight average molecular weight 1,600,000 g/mol (polystyrene standard). 100 parts by weight of the prepared acrylic copolymer, 0.125 parts by weight of a trimethylolpropane toluene diisocyanate adduct (L-45, Soken Chemical & Engineering Co., Ltd.) as a curing agent, 0.125 parts by weight of dibutyltin dilaurate (Promoter S, Soken Chemical & Engineering Co., Ltd.), and 0.3 parts by weight of γ-epoxypropyltrimethoxysilane (KBM403, Shin-Etsu Co., Ltd.) were dissolved in methylethylketone as a solvent, thereby preparing an adhesive layer composition.

The adhesive layer composition was coated onto a release film and cured under conditions of 35° C. and 45% RH to prepare a 25 μm thick adhesive film. Then, a plurality of adhesive films prepared as above was stacked one above another to fabricate a specimen having a thickness of 0.8 mm and a diameter of 8 mm. Thereafter, modulus of the specimen was measured using an Advanced Rheometry Expansion System (ARES) (TA instrument, parallel plate fixture) by temperature sweep testing (strain 5%, normal force 100 N, from 0° C. to 100° C. (heating rate: 10° C./min)) at a temperature from 23° C. and a frequency of 1 Hz. As a result, the specimen had a modulus of 0.08 MPa at 23° C.

A polarizer, a bonding layer composition, and a barrier layer composition were prepared in the same manner as in Example 1.

A polarizing plate was fabricated under conditions of 22° C. to 25° C. and 20% RH to 60% RH. The prepared bonding layer composition was deposited onto one surface of the protective film 1, which in turn was bonded to one surface of the polarizer to form a bonding layer. The barrier layer composition was deposited onto the other surface of the polarizer and irradiated with UV light at 400 mW/cm$^2$ and 1000 mJ/cm$^2$ using a metal halide lamp to form a barrier layer. Thereafter, the prepared adhesive layer composition was deposited onto a release film (polyethylene terephthalate film) to form an adhesive film. The adhesive film was attached to the barrier layer and subjected to aging at 35° C. and 45% RH for 48 hours, thereby fabricating a polarizing plate in which an adhesive layer (thickness: 20 μm), the barrier layer (thickness: 5 μm), the polarizer (thickness: 23 μm), the bonding layer (thickness: 3 μm), and the protective film 1 (thickness: 80 μm) are sequentially stacked.

Examples 10 and 11

Each of polarizing plates was fabricated in the same manner as in Example 9 except that the barrier layer composition was prepared using a curable component as listed in Table 1 (unit: parts by weight) instead of the curable component prepared by mixing 70 parts by weight of CELLOXIDE 8000 and 30 parts by weight of 2-hydroxyethyl acrylate.

Comparative Example 1

A polarizer and a bonding layer composition were prepared in the same manner as in Example 1. A curable component was prepared by mixing 80 parts by weight of CELLOXIDE 8000, 10 parts by weight of 2-hydroxyethyl acrylate, and 10 parts by weight of EX-141. The curable component was mixed with 2 parts by weight of Darocur TPO and 3 parts by weight of Irgacure 250, thereby preparing a layer composition.

A polarizing plate was fabricated under conditions of 22° C. to 25° C. and 20% RH to 60% RH. The prepared bonding layer composition was deposited onto one surface of the protective film 2 to form a bonding layer, which in turn was bonded to one surface of the polarizer. The coating layer composition was deposited onto the other surface of the polarizer and irradiated with UV light at 400 mW/cm$^2$ and 1000 mJ/cm$^2$ using a metal halide lamp, thereby fabricating a polarizing plate in which a coating layer (thickness: 5 μm), the polarizer (thickness: 23 μm), the bonding layer (thickness: 3 μm), and the protective film 2 (thickness: 80 μm) are sequentially stacked.

Comparative Examples 2 to 3

Each of polarizing plates was fabricated in the same manner as in Comparative Example 1 except that the coating layer composition was changed as listed in Table 1.

Comparative Example 4

A polarizing plate was fabricated in the same manner as in Example 1 except that the coating layer composition was prepared using a curable component as listed in Table 1 instead of the curable component prepared by mixing 70 parts by weight of CELLOXIDE 8000 and 30 parts by weight of 2-hydroxyethyl acrylate.

Comparative Example 5

A polarizer and a bonding layer composition were prepared in the same manner as in Example 1.

A polarizing plate was fabricated under conditions of 22° C. to 25° C. and 20% RH to 60% RH. The prepared bonding layer composition was deposited onto one surface of the protective film 1 to form a bonding layer, which in turn was bonded to one surface of the polarizer. The bonding layer and the polarizer were irradiated with UV light at 400 mW/cm$^2$ and 1000 mJ/cm$^2$ using a metal halide lamp, thereby fabricating a polarizing plate in which the polarizer (thickness: 23 μm), the bonding layer (thickness: 3 μm), and the protective film 1 (thickness: 80 μm) are sequentially stacked.

Components of each of the polarizing plates used in Examples and Comparative Examples are shown in Table 1.

TABLE 1

| | Barrier layer/coating layer | | | | | | Protective film | | Adhesive layer |
|---|---|---|---|---|---|---|---|---|---|
| | Alicyclic epoxy resin | | | Mono- or bifunctional (meth)acrylic compound | Epoxy monomer | | Tri- or higher functional (meth)acrylic compound | | |
| | A | B | C | D | E | F | G | H | I | |
| Ex. 1 | 70 | — | — | 30 | — | — | — | ○ | — | — |
| Ex. 2 | 80 | — | — | 10 | 10 | — | — | ○ | — | — |
| Ex. 3 | 60 | — | — | 20 | 20 | — | — | ○ | — | — |
| Ex. 4 | 60 | — | — | 25 | 10 | — | 5 | ○ | — | — |
| Ex. 5 | 60 | — | — | 35 | 5 | — | — | ○ | — | — |
| Ex. 6 | 70 | — | — | 25 | — | 5 | — | ○ | — | — |
| Ex. 7 | — | 60 | — | 35 | — | 5 | — | ○ | — | — |
| Ex. 8 | 10 | 60 | — | 20 | 10 | — | — | ○ | — | — |
| Ex. 9 | 70 | — | — | 30 | — | — | — | ○ | — | ○ |
| Ex. 10 | 80 | — | — | 10 | 10 | — | — | ○ | — | ○ |
| Ex. 11 | 60 | — | — | 25 | 10 | — | 5 | ○ | — | ○ |
| Comp. Ex. 1 | 80 | — | — | 10 | 10 | — | — | — | ○ | — |
| Comp. Ex. 2 | 95 | — | — | 5 | — | — | — | — | ○ | — |
| Comp. Ex. 3 | 70 | — | — | — | 10 | — | 20 | — | ○ | — |
| Comp. Ex. 4 | — | — | 60 | 40 | — | — | — | ○ | — | — |
| Comp. Ex. 5 | — | — | — | — | — | — | — | ○ | — | — |

Each of the polarizing plates fabricated in Examples and Comparative Examples was evaluated as to physical properties shown in Table 2.

TABLE 2

|  | Adhesion | Cuttability | Crack resistance | Light transmittance variation rate (%) | Polarization variation rate (%) | Moisture content variation rate (%) | Warpage (mm) |
|---|---|---|---|---|---|---|---|
| Ex. 1 | ○ | ◉ | X | 0.9 | 0.1 | 1.3 | — |
| Ex. 2 | ○ | ○ | X | 1.2 | 0.1 | 0.9 | — |
| Ex. 3 | ○ | ○ | X | 1.0 | 0.1 | 1.0 | — |
| Ex. 4 | ◉ | ○ | X | 0.9 | 0.1 | 1.0 | — |
| Ex. 5 | ◉ | ○ | X | 0.9 | 0.1 | 2.6 | — |
| Ex. 6 | ◉ | ◉ | X | 1.0 | 0.1 | 1.2 | — |
| Ex. 7 | ◉ | ◉ | X | 0.9 | 0.1 | 0.8 | — |
| Ex. 8 | ○ | ◉ | X | 1.1 | 0.1 | 1.1 | — |
| Ex. 9 | ○ | ○ | X | 1.5 | 0.1 | 1.2 | 2.0 |
| Ex. 10 | ◉ | ◉ | X | 0.8 | 0.1 | 2.1 | 1.2 |
| Ex. 11 | ◉ | ◉ | X | 0.7 | 0.1 | 0.9 | 1.2 |
| Comp. Ex. 1 | X | X | X | 61.2 | 3.6 | 6.1 | — |
| Comp. Ex. 2 | X | X | X | 48.8 | 5.5 | 5.5 | — |
| Comp. Ex. 3 | ○ | ◉ | ○ | 22.2 | 5.1 | 5.3 | — |
| Comp. Ex. 4 | ○ | ◉ | ○ | 3.5 | 0.2 | 1.2 | — |
| Comp. Ex. 5 | — | X | ○ | 48.3 | 3.3 | 3.3 | — |

As shown in Table 2, the polarizing plates fabricated in the examples exhibited good durability under high temperature/high humidity conditions. Further, the polarizing plates fabricated in the examples also exhibited good properties in terms of adhesion between the barrier layer and the polarizer, cuttability and crack resistance, and thus could prevent the polarizers from suffering from cracking even when the polarizing plates were left under thermal impact conditions. Furthermore, the polarizing plate including the adhesive layer had low warpage.

On the contrary, the polarizing plates fabricated in Comparative Examples 1 to 3 and each including the protective film having a moisture transmittance of greater than 30 g/m²·24 hr exhibited low durability under high temperature/high humidity conditions due to high moisture transmittance of the protective film. For the polarizing plate fabricated in Comparative Example 4 and including the coating layer including an alicyclic epoxy resin having a glass transition temperature of less than 200° C., the polarizer exhibited poor crack resistance. The polarizing plate fabricated in Comparative Example 5 and not including the barrier layer of the examples exhibited poor properties in terms of durability under high temperature/high humidity conditions, crack resistance, and cuttability.

(1) Adhesion: A cutter was inserted at a tip thereof between a barrier layer and a polarizer at one end of a polarizing plate. Adhesion between the barrier layer and the polarizer was evaluated according to the following criteria. The polarizing plate not allowing insertion of the tip of the cutter between the barrier layer and the polarizer was rated as ◉, the polarizing plate allowing slight insertion of the tip of the cutter therebetween was rated as ○; the polarizing plate, in which the barrier layer was torn due to certain strength thereof during insertion of the cutter although the tip of the cutter was slightly inserted between the barrier layer and the polarizer, was rated as Δ; and the polarizing plate allowing easy insertion of the tip of the cutter between the barrier layer and the polarizer was rated as X.

(2) Cuttability: A polarizing plate was punched to a size of 500 mm×500 mm (length×width) from a protective film side using a cutter blade. A delamination state of a barrier layer at four edges of the punched polarizing plate was observed with the naked eye. The polarizing plate suffering from no delamination was rated as ◉, the polarizing plate suffering from delamination of 1 mm or less was rated as ○; the polarizing plate suffering from delamination of greater than 1 mm and 2 mm or less was rated as Δ; and the polarizing plate suffering from delamination of greater than 2 mm was rated as X (3) Crack resistance: Crack resistance of a polarizing plate was evaluated under thermal shock conditions. The polarizing plate was cut to a size of 50 mm×50 mm (length× width), followed by lamination onto a glass sheet, thereby preparing a specimen. The specimen was subjected to 200 cycles of heat treatment, each of which included heating the specimen from −40° C. to 85° C. Here, the specimen was left at −40° C. for 30 minutes before heating and was left at 85° C. for 30 minutes after heating. Cracks of the polarizer generated in the MD were observed with the naked eye in a reflective mode and a backlight mode under a fluorescent lamp. Crack resistance of the polarizing plate was evaluated according to the following criteria. Generation of no crack was evaluated as X and even slight generation of cracks was evaluated as ○.

(4) Durability under high temperature/high humidity conditions: A polarizing plate having a size of 25 mm×25 mm (length×width) was laminated at the center of a glass substrate, followed by measuring an initial transmittance T0 and an initial degree of polarization P0 at a wavelength of 400 nm to 700 nm using a V-7170 (Jasco Corporation)(the device V-7170 automatically extract the value of an average transmittance at 400 nm to 700 nm). Then, the polarizing plate was left under conditions of 85° C. and 85% RH for 500 hours, and was then left at 25° C. for 1 hour, followed by measuring transmittance T500 and a degree of polarization P500 at a wavelength of 400 nm to 700 nm using a V-7170 (Jasco Corporation). Light transmittance variation rate was calculated by Equation 1 described above. Polarization variation rate was calculated by Equation 2 described above.

An initial weight A0 of a polarizing plate having a size of 10 mm×10 mm (length×width) before drying was measured. Then, the polarizing plate was dried in an oven at 105° C. for 2 hours, followed by measuring the weight B0 of the polarizing plate. An absolute value |A0−B0| is an initial moisture content W0 of the polarizing plate. Next, the polarizing plate was left under conditions of 85° C. and 85% RH for 500 hours, followed by measuring the weight A500 of the polarizing plate. Then, the polarizing plate was dried in an oven at 105° C. for 2 hours, followed by measuring the weight B500 of the polarizing plate. An absolute value |A500−B500| is a moisture content W500 of the polarizing plate after the polarizing plate is left under conditions of 85° C. and 85% RH for 500 hours. This value was calculated by Equation 3 described above.

Figure 4:
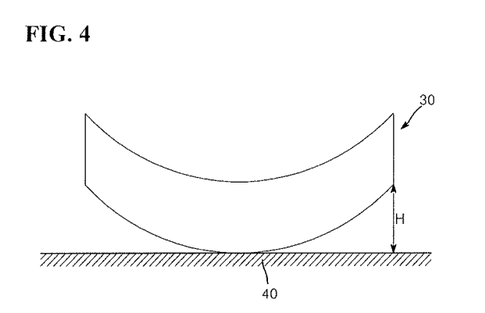
FIG. 4 illustrates a conceptual view illustrating measurement of warpage of a polarizing plate.

(5) Warpage: A polarizing plate was cut to a size of 150 mm×90 mm (the MD of the polarizer×the TD of the polarizer) to prepare a specimen, which in turn was attached to a 0.5 cm thick glass plate such that an adhesive layer of the polarizing plate contacted the glass plate, thereby preparing a specimen for warpage measurement. Warpage was measured after leaving the specimen at 85° C. for 24 hours. Referring to FIG. 4, warpage was defined as a maximum height H of a bent portion of a specimen 30 from a floor 40.

By way of summation and review, a polarizing plate includes a polarizer and protective films formed on both surfaces of the polarizer. A protective film is formed on one surface of the polarizer and a coating layer is formed on the other surface of the protective film to reduce thickness of the polarizing plate.

A polarizing plate having high durability under high temperature conditions may be employed. High temperature and high humidity conditions are more severe with respect to the polarizing plate than high temperature conditions. Moreover, the polarizer may be vulnerable to moisture, particularly, under high humidity conditions. Accordingly, even a polarizing plate having high durability under high temperature conditions may be limited with respect to durability under high temperature and high humidity conditions and in improvement in crack resistance of the polarizer.

As described above, embodiments may provide a polarizing plate exhibiting excellent durability under high temperature/high humidity conditions. Embodiments may provide a polarizing plate which includes a barrier layer exhibiting excellent adhesion to a polarizer and is capable of improving crack resistance of the polarizer under high temperature and high humidity conditions. Embodiments may provide a polarizing plate having a thin structure and a light weight and exhibiting good cuttability. Embodiments may provide a polarizing plate that minimizes warpage.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A polarizing plate, comprising:
a polarizer;
a bonding layer on an upper surface of the polarizer;
a protective film on an upper surface of the bonding layer and having a moisture transmittance of about 30 $g/m^2 \cdot 24hr$ or less; and
a barrier layer on a lower surface of the polarizer and formed of a barrier layer composition including an alicyclic epoxy resin having a glass transition temperature of more than 200° C.,
wherein the polarizing plate has a light transmittance variation rate of 3 % or less, as calculated by Equation 1:

$$\text{Light transmittance variation rate} = |T0 - T500|/T0 \times 100 \quad (1),$$

where T0 is an initial light transmittance of the polarizing plate at a wavelength of 400 nm to 700 nm and T500 is a light transmittance of the polarizing plate at a wavelength of 400 nm to 700 nm after the polarizing plate is left at 85° C. and 85% RH for 500 hours and is then left at 25° C. for 1 hour,
wherein the polarizing plate has a thickness of about 115 μm or less,
wherein the polarizer is formed of a polyvinyl alcohol film, and the barrier layer is in direct contact with the polyvinyl alcohol film.

2. The polarizing plate as claimed in claim 1, wherein the polarizing plate has a moisture content variation rate of about 10% or less, as calculated by Equation 3:

$$\text{Moisture content variation rate} = |W500 - W0|/W0 \times 100 \quad (3),$$

where W0 is an initial moisture content of the polarizing plate and W500 is a moisture content of the polarizing plate after the polarizing plate is left at 85° C. and 85% RH for 500 hours.

3. The polarizing plate as claimed in claim 1, wherein the protective film has an in-plane retardation (Re) of about 5,000 nm or more at a wavelength of 550 nm, as calculated by Equation 4:

$$Re = (nx - ny) \times d \quad (4),$$

where nx and ny are indices of refraction of the protective film at a wavelength of 550 nm in x-axis and y-axis directions of the protective film, respectively, and d is a thickness of the protective film in units of nm.

4. The polarizing plate as claimed in claim 1, wherein the protective film includes a film formed of a polyester resin.

5. The polarizing plate as claimed in claim 4, wherein the polyester resin includes at least one selected from among polyethylene terephthalate, polyethylene naphthalate, polybutylene terephthalate, and polybutylene naphthalate.

6. The polarizing plate as claimed in claim 1, wherein the protective film includes a film formed by stretching a film including a polyester resin at an elongation of 5 times to 8 times an initial length thereof in a transverse direction (TD).

7. The polarizing plate as claimed in claim 1, wherein a machine direction (MD) of the polarizer is orthogonal to a transverse direction (TD) of the protective film.

8. The polarizing plate as claimed in claim 1, wherein a ratio of a total thickness of the protective film and the bonding layer to a thickness of the barrier layer ranges from about 10:1 to about 50:1.

9. The polarizing plate as claimed in claim 1, wherein the barrier layer has a thickness of about 2 μm to about 12 μm.

10. The polarizing plate as claimed in claim 1, wherein the alicyclic epoxy resin is present in an amount of about 40 wt % to about 90 wt % in the barrier layer composition in terms of solid content.

11. The polarizing plate as claimed in claim 1, wherein the barrier layer composition includes the alicyclic epoxy resin; a monofunctional (meth)acrylic compound, a bifunctional (meth)acrylic compound, or a mixture thereof; and an initiator.

12. The polarizing plate as claimed in claim 11, wherein each of the monofunctional (meth)acrylic compound and the bifunctional (meth)acrylic compound includes at least one hydroxyl group.

13. The polarizing plate as claimed in claim 11, wherein the barrier layer composition includes at least one of an epoxy monomer and a tri- or higher functional (meth)acrylic compound.

14. The polarizing plate as claimed in claim 13, wherein the epoxy monomer includes a monofunctional epoxy monomer.

15. The polarizing plate as claimed in claim 1, further comprising an adhesive layer on a lower surface of the barrier layer.

16. The polarizing plate as claimed in claim 15, wherein the adhesive layer has a modulus of about 0.1 MPa or less at 23° C.

17. An optical display comprising the polarizing plate as claimed in claim 1.

18. A polarizing plate, comprising:
a polarizer;
a bonding layer on an upper surface of the polarizer;
a protective film on an upper surface of the bonding layer and having a moisture transmittance of about 30 g/m2·24 hr or less; and
a barrier layer on a lower surface of the polarizer and formed of a barrier layer composition including an alicyclic epoxy resin having a glass transition temperature of about 200° C. or more, wherein the polarizing plate has a light transmittance variation rate of 3% or less, as calculated by Equation 1:

$$\text{Light transmittance variation rate} = |T0 - T500|/T0 \times 100 \quad (1),$$

where T0 is an initial light transmittance of the polarizing plate at a wavelength of 400 nm to 700 nm and T500 is a light transmittance of the polarizing plate at a wavelength of 400 nm to 700 nm after the polarizing plate is left at 85° C. and 85% RH for 500 hours and is then left at 25° C. for 1 hour, further comprising an adhesive layer on a lower surface of the barrier layer, wherein the adhesive layer has a modulus of about 0.1 MPa or less at 23° C.

19. The polarizing plate as claimed in claim 18, wherein the alicyclic epoxy resin is present in an amount of about 40 wt % to about 90 wt % in the barrier layer composition in terms of solid content.

20. The polarizing plate as claimed in claim 18, wherein the polarizing plate has a warpage of about 3 mm or less, wherein in measuring the warpage of the polarizing plate, the polarizing plate is cut to a size of 150 mm as measured in the MD of the polarizer×90 mm as measured in the TD of the polarizer to prepare a specimen, which in turn is attached to a 0.5 cm thick glass plate such that the adhesive layer of the polarizing plate contacted the glass plate, thereby preparing a specimen for the warpage measurement and warpage is measured after leaving the specimen at 85° C. for 24 hours.

* * * * *